(12) United States Patent
Pilevar

(10) Patent No.: US 6,862,385 B2
(45) Date of Patent: Mar. 1, 2005

(54) TAP MONITOR

(75) Inventor: Saeed Pilevar, Potomac, MA (US)

(73) Assignee: GOI Acquisition LLC, Millersville, MD (US)

( * ) Notice: Subject to any disclaimer, the term of this patent is extended or adjusted under 35 U.S.C. 154(b) by 156 days.

(21) Appl. No.: 10/247,581

(22) Filed: Sep. 20, 2002

(65) Prior Publication Data

US 2003/0108298 A1 Jun. 12, 2003

(51) Int. Cl.⁷ .............................. G02B 6/42; G02B 6/26
(52) U.S. Cl. .............................. 385/42; 385/48; 385/49
(58) Field of Search ............................... 385/30, 31, 42, 385/44, 45, 48, 49, 14

(56) References Cited

U.S. PATENT DOCUMENTS

| | | | |
|---|---|---|---|
| 4,632,513 A | * | 12/1986 | Stowe et al. |
| 4,722,586 A | | 2/1988 | Dodson et al. |
| 4,738,511 A | | 4/1988 | Fling |
| 4,772,085 A | * | 9/1988 | Moore et al. |
| 4,798,438 A | * | 1/1989 | Moore et al. |
| 4,834,481 A | * | 5/1989 | Lawson et al. |
| 4,844,573 A | * | 7/1989 | Gillham et al. ............... 385/42 |
| RE33,296 E | * | 8/1990 | Stowe et al. |
| 4,997,286 A | | 3/1991 | Fehrenbach et al. |
| 5,138,676 A | | 8/1992 | Stowe et al. |
| 5,355,426 A | * | 10/1994 | Daniel et al. |
| 5,500,917 A | * | 3/1996 | Daniel et al. ................. 385/99 |
| 5,596,665 A | | 1/1997 | Kurashima et al. |
| 5,644,666 A | * | 7/1997 | Campbell et al. |
| 5,682,453 A | * | 10/1997 | Daniel et al. |
| 5,909,523 A | * | 6/1999 | Sakaino et al. ............... 385/49 |
| 6,144,792 A | * | 11/2000 | Kim et al. ................... 385/135 |
| 6,636,670 B2 | * | 10/2003 | Deufel ........................ 385/43 |
| 2003/0053763 A1 | * | 3/2003 | Goto ........................... 385/88 |

FOREIGN PATENT DOCUMENTS

GB 2335504 9/1999

* cited by examiner

Primary Examiner—Edward J. Glick
Assistant Examiner—Thomas R Artman
(74) Attorney, Agent, or Firm—Shaw Pittman LLP

(57) ABSTRACT

A tap monitor including provisions to accommodate misalignment is disclosed. The tap monitor includes an optical coupler tuned to a desired optical splitting ratio. The light output of one of the output fibers or legs is directed to a sensor. The sensor resides in a hole in the substrate and is configured to absorb substantially all of the optical energy regardless of the precise alignment between the sensor and the fiber. Also disclosed are multiple tap monitors disposed in an array.

19 Claims, 17 Drawing Sheets

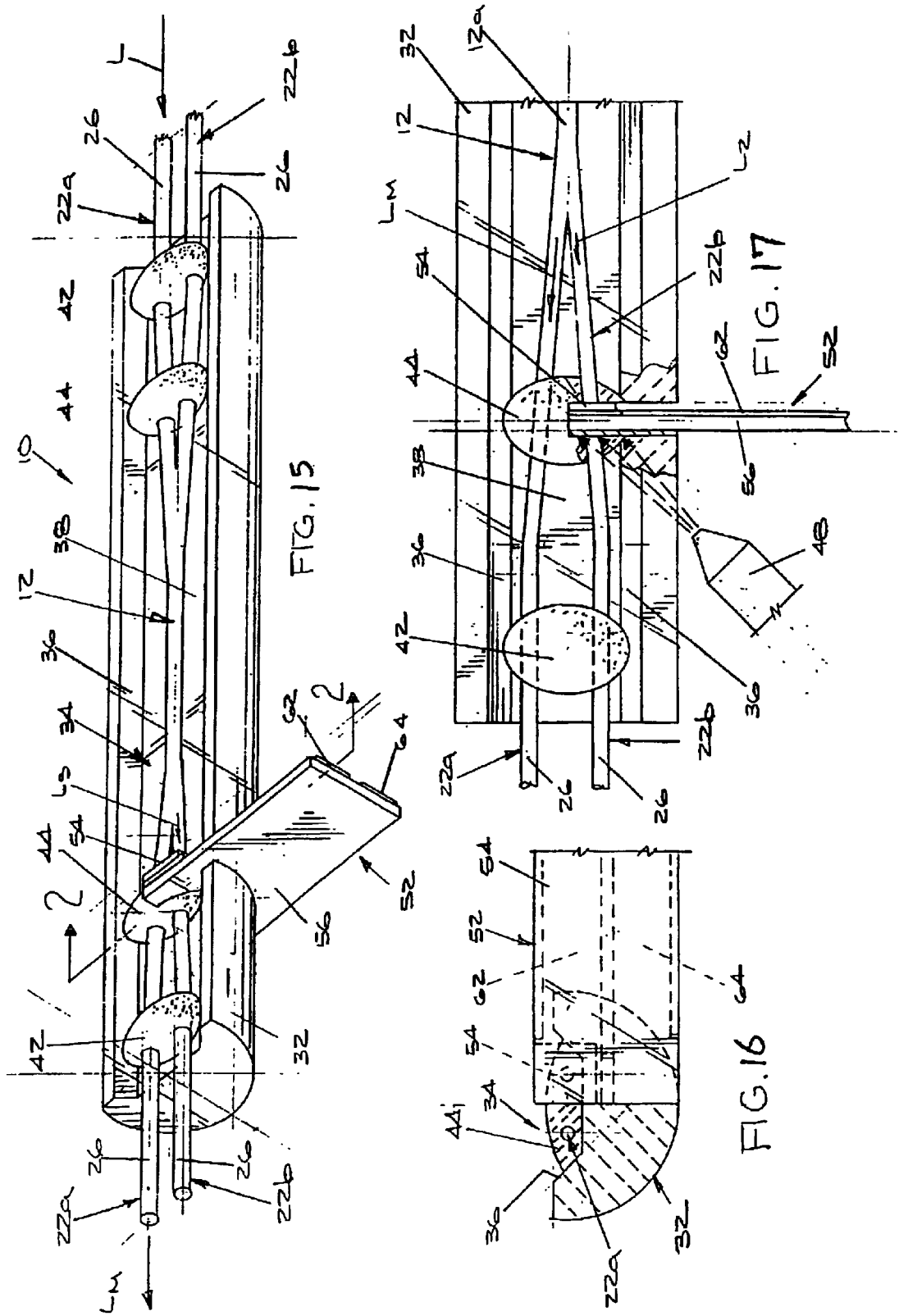

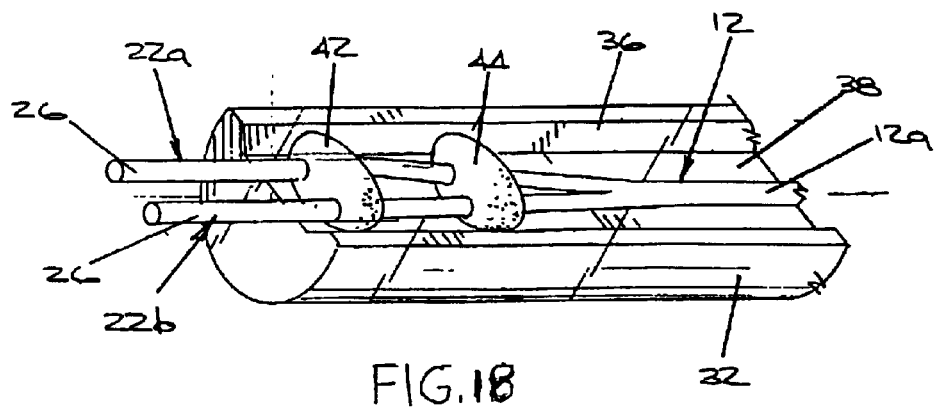
FIG.18
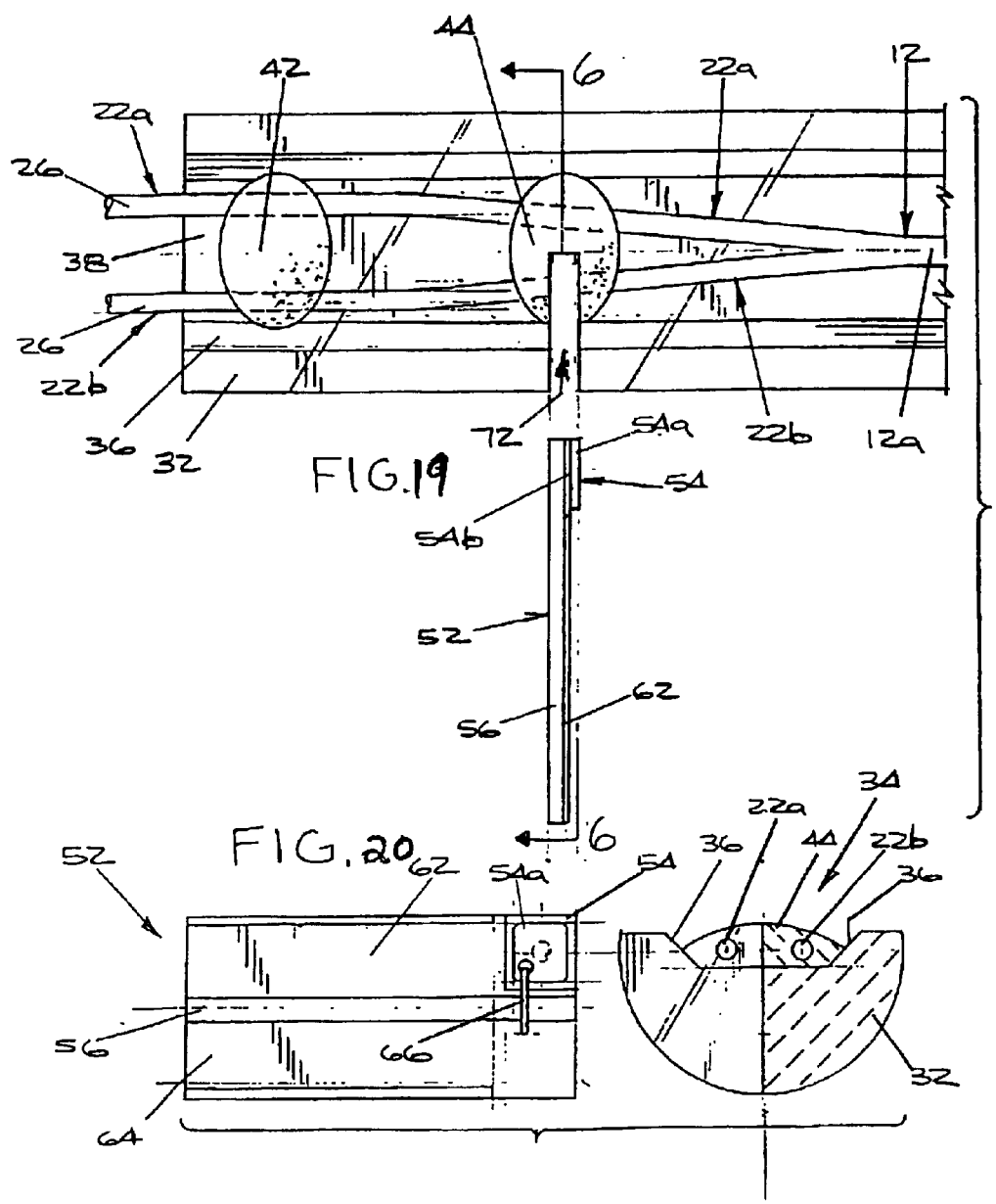
FIG.19
FIG.20

TAP MONITOR

BACKGROUND

1. Field of the Invention

The present invention relates generally to optical devices, and more particularly, to a device that senses the optical activity of a fiber. These devices are also referred to as tap monitors.

2. Background of the Invention

Prior attempts to sense or detect the optical activity in a given fiber, while serviceable, are less than ideal. Often, prior art devices have been extremely sensitive to heat, thermal expansion, physical shock and other environmental and external forces. Even slight changes in some ambient condition or even slight external forces can cause prior art devices to lose accuracy or significantly alter its sensing characteristics.

SUMMARY OF THE INVENTION

The present invention is directed to a tap monitor including a first optical fiber and a second optical fiber joined together by a fused region, the ends of the fused region being rigidly attached to a substrate by a first joint and a second joint. The tap monitor also includes a third and a fourth fiber extending from the fused region. The first fiber receives an optical signal and the third and fourth fibers are configured to output an optical signal. A sensor, having a certain diameter is disposed in optical communication with the fourth fiber. The sensor is placed in a hole disposed in the substrate and the fourth optical fiber is cleaved generally flush with an edge of the hole. Because of this arrangement, the output of the fourth optical fiber is directed at the sensor and the distance between the fourth optical fiber and the sensor is less than the diameter of the sensor.

In another aspect of the invention, an end of the fourth fiber extends beyond the second joint.

In another aspect of the invention, the first and second joints include glasssoldered joints.

In another aspect of the invention, the fourth fiber receives less than 10% of the light entering through the first fiber.

In another aspect of the invention, the fourth fiber receives less than 5% of the light entering through the first fiber.

In another aspect of the invention, the fourth fiber receives less than 1% of the light entering through the first fiber.

In another aspect of the invention, the sensor is bonded to the hole.

In another aspect of the invention, the sensor is disposed in a hole disposed at an angle with respect to the third fiber.

In another aspect of the invention, the sensor is attached to an edge of the substrate.

In another aspect, the invention includes an array assembly including an enclosure configured to receive at least one tap module, a first tap module includes a substrate, and a first optical fiber, the first optical fiber includes an incoming portion, an inner portion and an outgoing portion. The inner portion includes a fused, bi-conically tapered region where a second fiber is fused with the first optical fiber. The second fiber includes a first end proximate to the incoming portion of the first fiber and a second end proximate to the outgoing portion of the first fiber. The second end is disposed proximate a slot and a sensor. The sensor is configured to receive a signal from the second end. The enclosure includes a second tap module similar to the first tap module, and both the first and second tap modules are contained within the enclosure.

In another aspect of the invention, a first side wall includes a first receiving portion.

In another aspect of the invention, a second side wall includes a second receiving portion.

In another aspect of the invention, a bottom of the enclosure includes at least one hole.

In another aspect of the invention, the hole is configured to receive a pin.

In another aspect of the invention, the pin is configured to engage a notch disposed in the substrate of the first tap module.

In another aspect of the invention, an incoming ferrule is aligned with a first receiving portion when the pin engages the notch.

In another aspect of the invention, an outgoing ferrule is aligned with a second receiving portion when the pin engages the notch.

In another aspect of the invention, the incoming fiber includes an incoming ferrule and the outgoing fiber includes an outgoing ferrule.

In another aspect of the invention, the incoming ferrule engages the first receiving portion and the outgoing ferrule engages the second receiving portion.

Additional features and advantages of the invention will be set forth in the description which follows, and in part will be apparent from the description, or may be learned by practice of the invention. The objectives and advantages of the invention will be realized and attained by the structure and steps particularly pointed out in the written description, the claims and the drawings.

BRIEF DESCRIPTION OF THE DRAWINGS

FIG. 15 is a perspective view of an optical device for generating an electrical signal that is a function of the optical power in an optical fiber illustrating an embodiment of the present invention.

FIG. 16 is an enlarged, sectional view taken along lines 2—2 of FIG. 15.

FIG. 17 is a top plan view of one end of the device shown in FIG. 15, schematically illustrating how a photo sensor is mounted thereto.

FIG. 18 is a perspective view of one end of a coupler mounted to a substrate according to a preferred embodiment of the present invention.

FIG. 19 is a top plan view of the coupler and substrate shown in FIG. 15 with a slot formed therein to receive a photo sensor.

FIG. 20 is a sectional view taken along lines 6—6 of FIG. 19 showing a photo sensor removed from the slot.

DETAILED DESCRIPTION OF THE PREFERRED EMBODIMENTS

Figure 1:
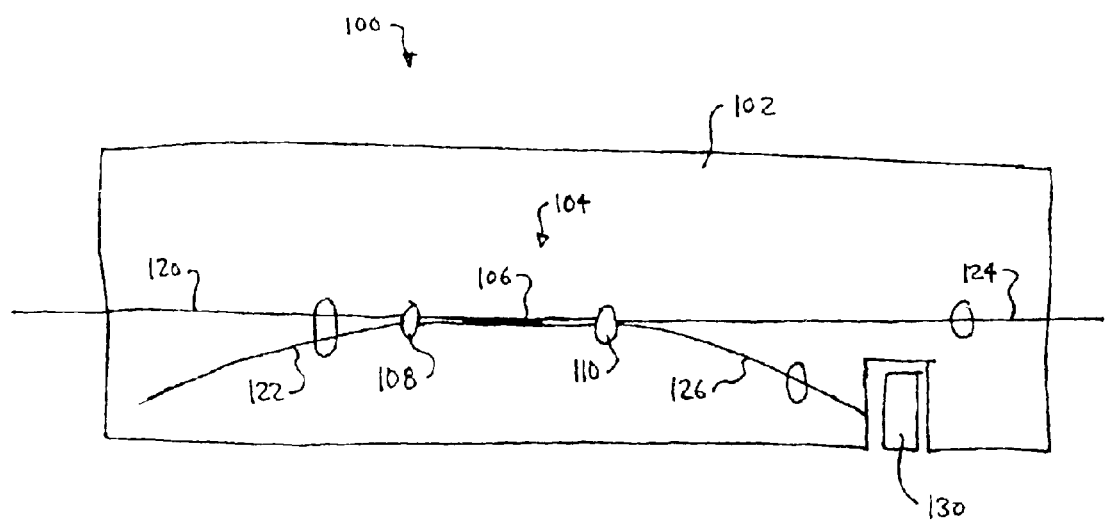
FIG. 1 is a schematic view of a preferred embodiment of a tap monitor in accordance with the present invention.

The tap monitor 100 includes a substrate 102. Substrate 102 can be glass, metal, non-metallic, composite material, or any other structure that can provide physical support to an optical fiber.

In accordance with an embodiment of the present invention, the tap monitor is constructed by using a pair of optical fibers that are fused together using fused bi-conical taper technology. U.S. Pat. No. Reissue 33,296 (originally, U.S. Pat. No. 4,632,513), U.S. Pat. Nos. 4,798,438, 4,834,481, 4,772,085, 5,355,426, 5,682,453, 5,500,917, and 5,644,666 all disclose systems and methods for producing fused bi-conical tapered optical fibers. All of these patents are incorporated by reference herein in their entirety.

The fused optical fibers result in an optical device 104. Optical device 104 includes a fused region 106. Preferably, first 108 and second ends 110 of fused region 106 are associated with substrate 102. In some embodiments, the first 108 and second 110 ends are rigidly associated with substrate 102. In exemplary embodiments, first 108 and second ends 110 are associated by using a GlassolderTM process. In other embodiments, first 108 and second ends 110 can be joined to substrate 102 by the use of epoxy.

Several optical fibers can extend from fused region 106. In one embodiment, four optical fibers, a first fiber 120, a second fiber 122, a third fiber 124 and a fourth fiber 126 extend from joined region 106. In this embodiment, first fiber 120 receives an optical signal. Tap monitor 100 is designed to measure some aspect of this signal, including signal strength. Other aspects of the signal that can be measured include signal wavelength, and/or polarization, for example.

The signal from first fiber 120 enters fused region 106. In this embodiment, fused region 106 splits the optical signal. There are many different ways the signal can be split. In some embodiments, third fiber 124 is used as the output fiber. In other words, third fiber 124 carries enough of the incoming signal to permit the proper function of downstream devices that are in communication with fiber 124.

Fourth fiber 126 can be used as the sensing fiber. The signal traveling through this fiber is placed in communication with a sensor 130. Sensor 130 is used to detect desired properties of the optical signal. In a preferred embodiment, sensor 130 is used to detect the signal strength of the optical signal. In other embodiments, sensor 130 can be used to detect other properties. Generally, different sensors can be placed in communication with fourth fiber 126 if it is desired that different properties of the optical signal are detected or measured.

In order to monitor the health of the system and detect any interruption or variation in the transmitted optical signal, it is desirable to tap off a certain portion of the signal depending on the system's power budget and actively monitor that tapped portion. For example, in one application, it is essential to place a tap monitor after an optical amplifier. To insure that the maximum amount of signal is transferred from first fiber 120 to third fiber 124, it is generally desirable to tap the least amount of energy from the incoming optical signal. In this regard, it is preferred that 1–10% of the optical signal is sent to fourth fiber 126 from fused region 106. Of course, much smaller and much larger proportions could also be used. Any desired amount of optical energy, even the majority of optical energy, can be diverted to fourth fiber 126 if needed. By carefully adjusting and controlling the coupling ratio of fused region 106, thereby, adjusting and controlling the amount of optical energy sent to the third 124 and fourth 126 fibers, designers can fabricate tap monitor 100 to suit a variety of different conditions, design requirements, and/or performance specifications.

The second optical fiber 122 is generally not used in the tap monitor device 100. To avoid reflections, stray light or signals from entering fused region 106 via second optical fiber 122 and possibly corrupting the optical signal, a Low Reflection Termination ("LRT") 132 can be used on second fiber 122.

The power in second input or second optical fiber 122 is extremely low which is the result of back reflection from the out put ports and also the reflection from the fused region. It is generally of the order of −60 dB. Second optical fiber 122 can be monitored as a tap leg provided the photodetector used with second optical fiber 122 has a very high sensitivity and the signal to noise ratio is reasonable for detecting such a small power.

In some embodiments, the fibers are associated with substrate 102. Preferably, the fibers are bonded to substrate 102 using a glass-based bonding composition and using a proprietary bonding technique disclosed in U.S. Pat. Nos. 5,500,917 and 5,682,453, the disclosures of which are hereby incorporated by reference in their entirety.

Figure 2:
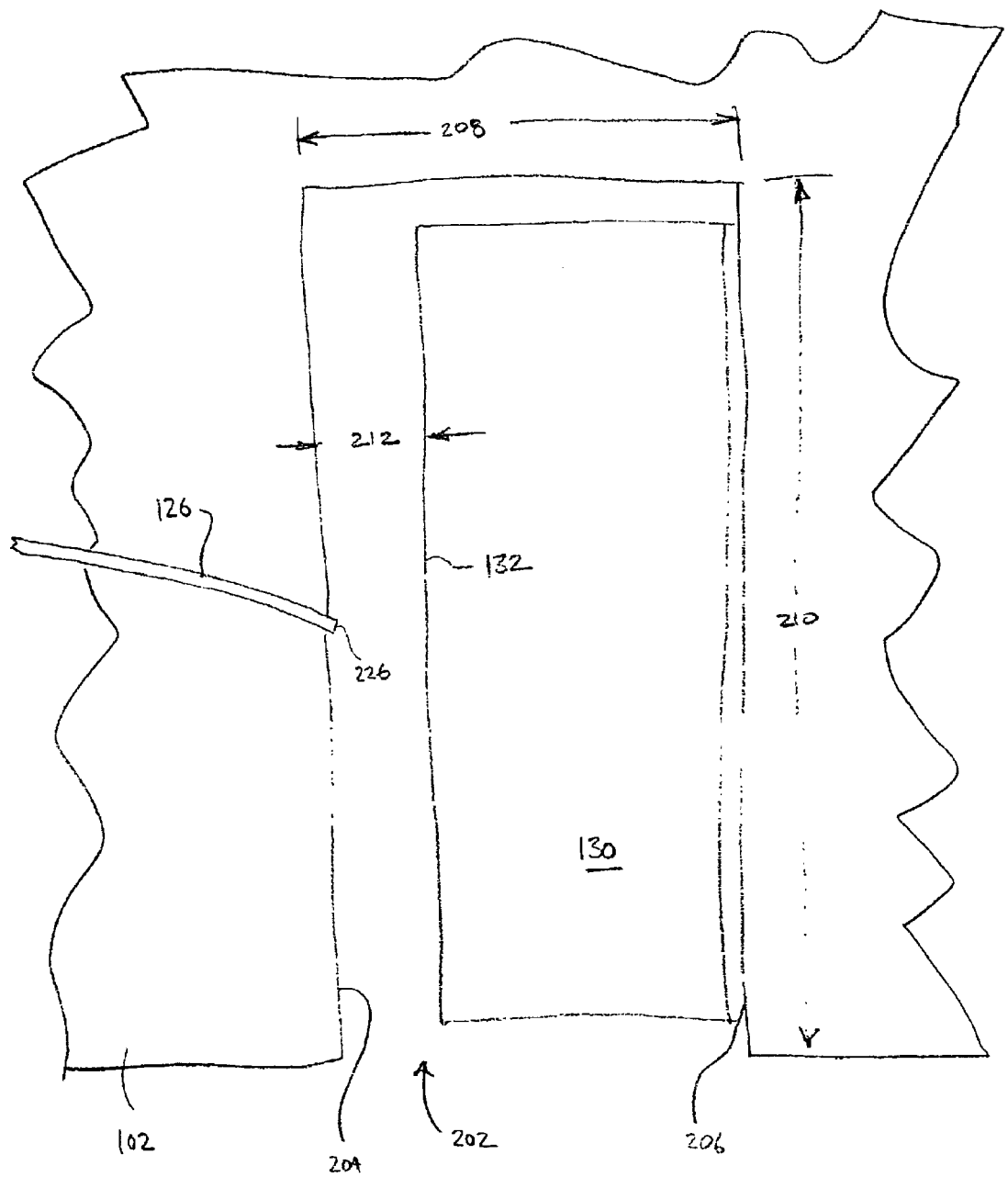
FIG. 2 is an enlarged view of a portion of a preferred embodiment of a tap monitor in accordance with the present invention.

FIG. 2 is an enlarged view of a portion of fourth fiber 126 and sensor 130. As shown in FIG. 2, substrate 102 includes a hole 202 or a slot. Hole 202 includes a first edge 204 and a second edge 206. First edge 204 is disposed on one side of hole 202 and second edge 206 is disposed on the opposite side of hole 202. Hole 202 also includes a width 208 and a length 210. The terms "width" and "length" simply refer to two non-parallel dimensions of hole 202, as opposed to a literal width and length.

Hole 202 is designed in a way that accommodates both sensor 130 and the relative placement of fourth fiber 126 from sensor 130. Some of the ways hole 202 can be designed to accommodate sensor 130 include: providing a suitable width 208 and length 210 so that sensor 130, or the necessary portion of sensor 130, can fit within hole 202; providing a suitable clearance 212 between first edge 204 and front face 132 of sensor 130; providing spaces or provisions for any infrastructure sensor 130 may need, some examples of infrastructure sensor 130 may need include, space to accommodate wiring to and from sensor 130, spacing to provide suitable physical mounting arrangements for sensor 130, and providing suitable power arrangements for sensor 130. Some of these criteria for the design of hole 202 are related to the type of sensor 130 that is selected and used in any particular embodiment of the present invention. The invention encompasses any adjustment or modification to the shape, and/or size of hole 202 to accommodate any suitable sensor.

Second edge 206 can be used to provide a secure, and physically predetermined support for sensor 130.

Preferably, fourth fiber 126 terminates proximate first edge 204. In this way, the entire optical energy contained in fourth fiber 126 is transmitted to sensor 130 and sensor 130 is able to receive practically all of the optical energy contained in fourth fiber 126.

Figure 3A:
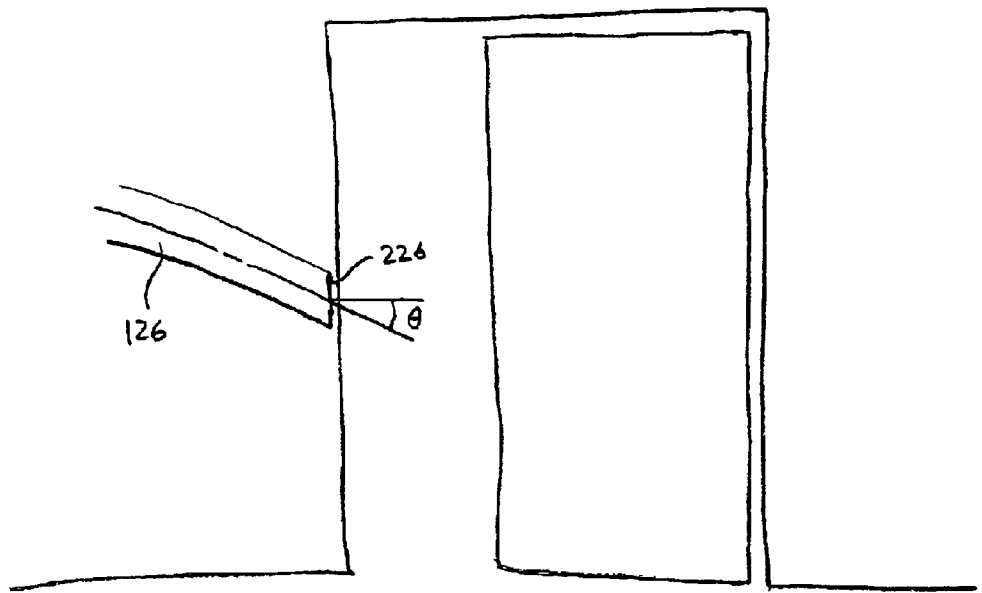
FIGS. 3A and 3B are an enlarged views of a portion of a preferred embodiment of a tap monitor showing a cleave angle in accordance with the present invention.
Figure 3B:
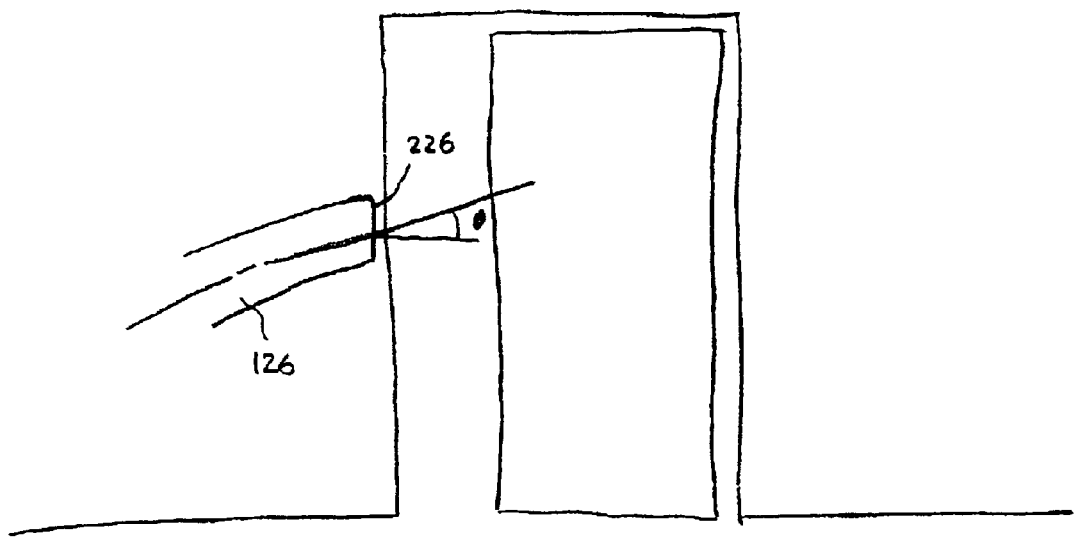
Figure 4A:
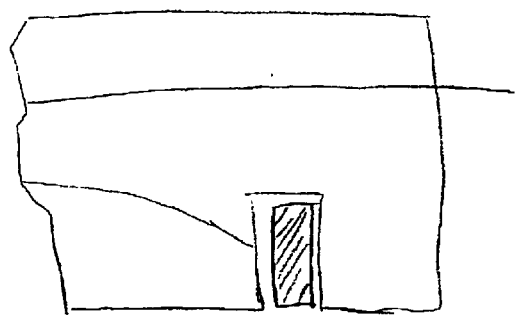
FIGS. 4A–4G are schematic diagrams of embodiments of holes in accordance with the present invention.
Figure 4B:
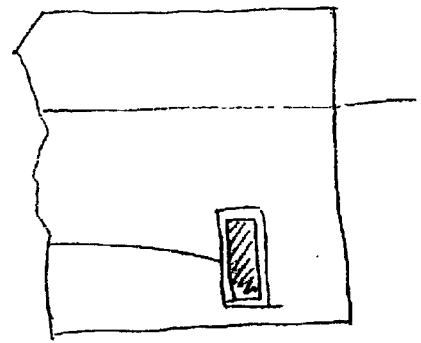
Figure 4C:
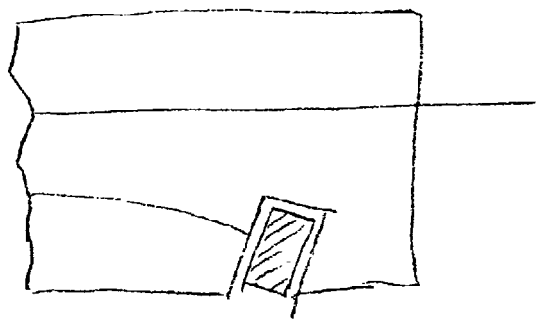
Figure 4D:
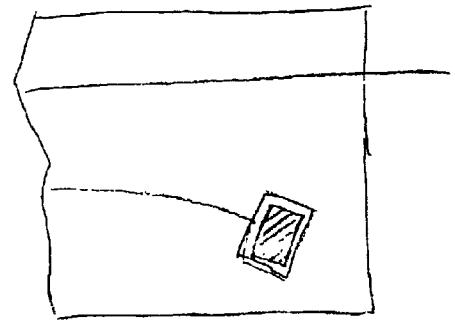
Figure 4E:
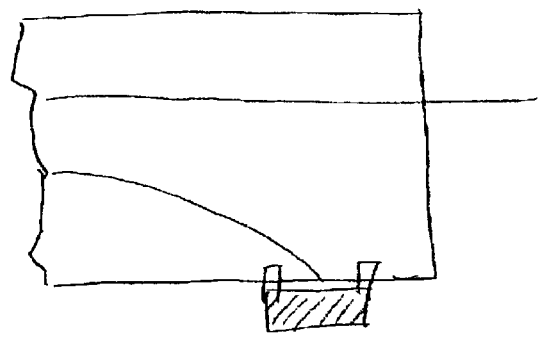
Figure 4F:
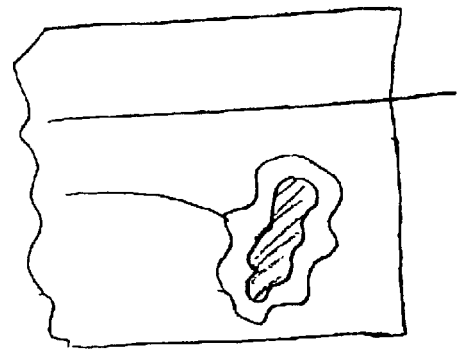
Figure 4G:
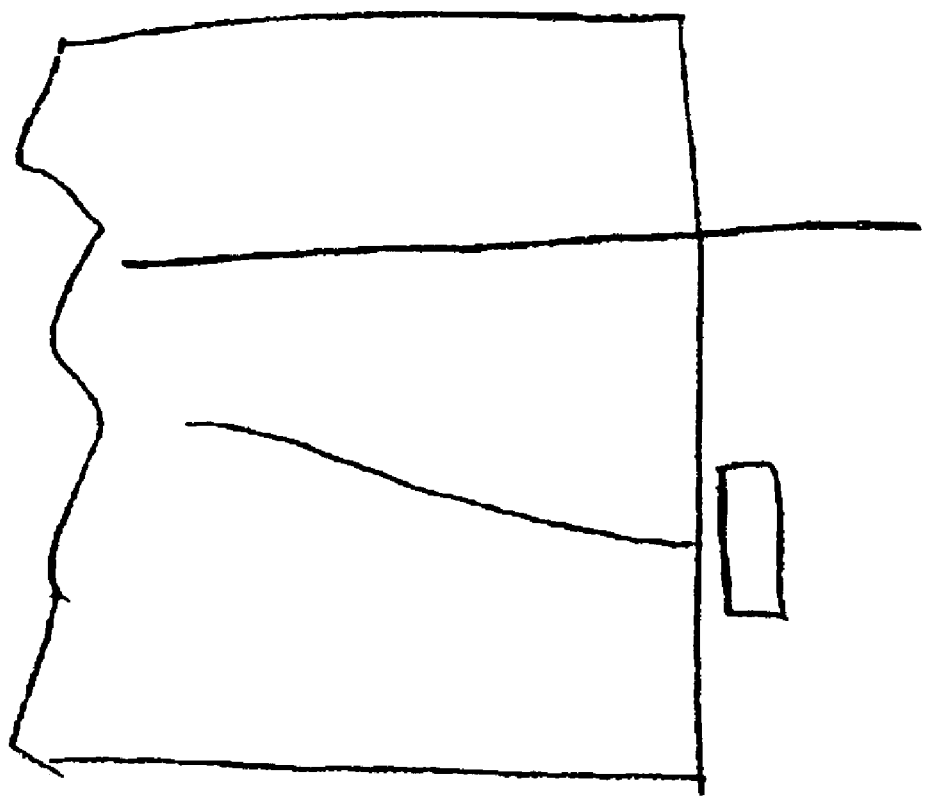

As shown in FIG. 3, preferably, fourth fiber 126 is cut or cleaved at an angle. Preferably, this angle is acute, and in some embodiments, the angle can be about 7 degrees. This cleave angle helps to reduce 4% Fresnel reflection at the glass-air interface.

The fourth fiber 126 can also be placed or cut in such a way that end 226 of fourth fiber 126 is flush with first edge 204. This can be done to accommodate an epoxy or other material that can be disposed in gap 212 between fourth fiber 126 and sensor 130. An epoxy can optionally be applied or placed in gap 212. The epoxy can be index matched to that of the fiber core to avoid any standing interference pattern formed by the Febry-Perot etalon created between the fiber tip and photo-detector active region. The optional epoxy, if used, can also provide additional support to forth fiber 126 and sensor 130. The epoxy or other material can also assist in maintaining a proper gap 212 between end 226 of fourth fiber 126 and sensor 130. Because the epoxy or other material would eliminate air gaps, this would help prevent back reflections.

Figure 5:
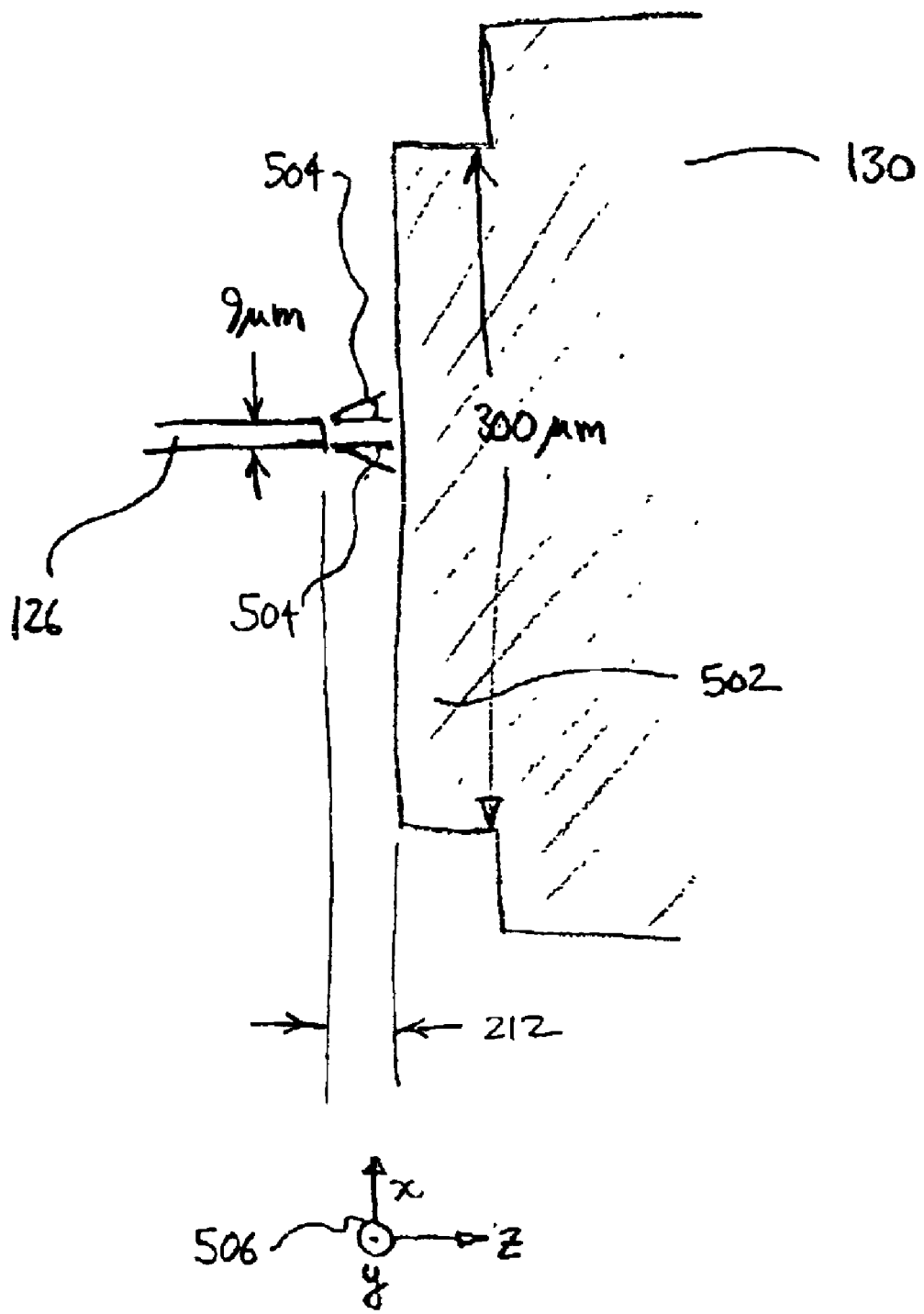
FIG. 5 is a schematic diagram of a fiber and a sensor of preferred embodiment of a latch in accordance with the present invention.

This arrangement helps to positively align fourth fiber 126 with sensor 130 and to insure that sensor 130 receives the optical energy from fourth fiber 126. This alignment between fourth fiber 126 and sensor 130 can be demonstrated by a physical example. Referring to FIG. 5, consider a situation where fourth fiber 126 is about 9 microns in diameter. Sensor 130 is typically a sensor that has an active area 502 of between 125 microns to 500 microns. In other words, sensors with active areas that are about 125 microns have some of the smaller active areas among typical sensors.

So, proceeding with a physical example using a relatively small active sensor area 502 of 125 microns, the tap monitor 100 still exhibits considerable and unprecedented levels of tolerance to alignment irregularities than previous devices. Preferably, the axial gap 212 between fourth fiber 126 and sensor 130 is about 0–2 mm, and in exemplary embodiments, the gap 212 is about 0.25 to 0.50 mm. Given this gap, and given the divergence of light angle 504, which is about 10.8°, it is highly likely that an active area 502 having a diameter of 300 microns will collect all of the light transmitted by fourth fiber 126, as shown in FIG. 3. This is because of the relatively large size of active area 502 in relation to fourth fiber 126 diameter, the relatively small distance or gap 212 separating fourth fiber 126 from active area 502.

Also apparent from the physical example, is the fact that a tap monitor constructed according to principles of the present invention will exhibit relatively high resistance to misalignment in virtually any direction or axis. Assuming a Cartesian coordinate system 506 shown in FIG. 5, where the X-axis represents a vertical dimension, where the Y-axis represents a dimension extending into and out of the plane of the page, and where the Z-axis represents an axial dimension between fourth fiber 126 and sensor 130, it is apparent that, regardless of misalignments in any of the three directions, sensor 130 will be able to collect virtually all of the optical energy or signal emanating from fourth fiber 126.

Due to the very large relative size—in some embodiments, orders of magnitude—of sensor active area 502 with respect to fourth fiber 126, misalignment in the X and/or Y axes will still result in active area 502 absorbing virtually all of the optical energy from fourth fiber 126. Similarly, any misalignment within about 0.25 mm in the Z-axis, the gap 212 from fourth fiber 126 to active area 502, will still result in active area 502 receiving virtually all of the optical energy of fourth fiber 126. The principles of the above disclosed physical example apply even if the exact physical dimensions are varied greatly and even if the proportions of the physical sizes is varied extensively.

Although features of the present invention are able to accommodate misalignment, proper alignment is still desirable. To assist in properly aligning the various components, substrate 102 preferably includes grooves or slots of desired height and width cut into its upper surface. Preferably, the grooves are etched using a buffered solution of hydrofluoric acid. The grooves can be formed by covering the substrate with a mask of a desired pattern and etching the uncovered portions of substrate 102 by subjecting those uncovered portions to the buffered hydrofluoric acid solution. This process is similar to process used to make wafers in semiconductor technology.

Figure 6:
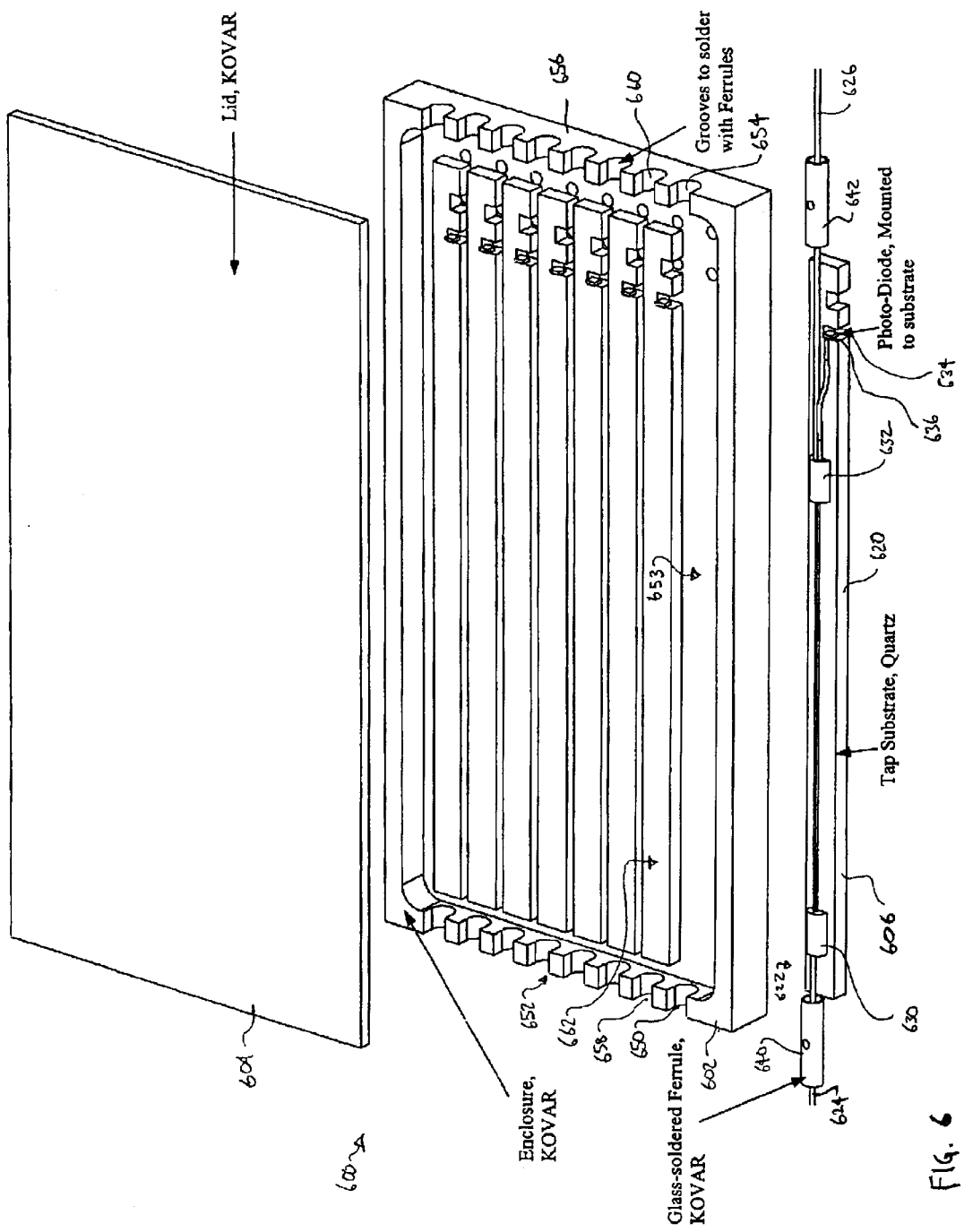
FIG. 6 is an isometric view of an embodiment of an array of tap monitors in accordance with the present invention.

FIG. 6 shows an array embodiment of the present invention. Array assembly 600 includes an enclosure 602, a lid 604 and at least one tap module 606. Lid 604 is designed to cover enclosure 600. Any suitable connection can be used to join lid 604 with enclosure 602, however, seam welding is preferred. Enclosure 602 is configured to receive or accommodate at least one tap module 606. Preferably, enclosure 602 can accommodate a plurality of tap modules. Preferably, enclosure 602 and lid 604 are made of KOVAR.

Tap module 606 comprises a tap substrate 620 and an optical fiber 622. Preferably, tap module 606 is similar to tap monitor 100 (see FIG. 1). Optical fiber 622 includes an incoming portion 624 and an outgoing portion 626. Disposed between these two outer portions is an inner portion 628. Inner portion 628 includes a fused, bi-conical tapered region. Disposed between incoming portion 624 and inner portion 628 is a first rigid joint 630 and disposed between inner portion 628 and outgoing portion 626 is a second rigid joint 632.

Substrate 620 includes a hole or slot 634 (referred to "hole"). Hole 634 is configured to receive an sensor 636. Preferably, hole 634 is disposed in a region of substrate 620 proximate outgoing portion 626.

Preferably, incoming portion 624 and outgoing portion 626 include ferrules. These ferrules assist in supporting incoming portion 624 and outgoing portion 626, and help to seal the interior of enclosure 602. In the embodiment shown in FIG. 6, incoming portion includes an incoming ferrule 640 and outgoing portion includes an outgoing ferrule 642.

Enclosure 602 includes at least one receiving portion 650. Preferably, receiving portion 650 is disposed on a side wall 652 of enclosure 602, and is designed to receive a portion of tap module 606. In a preferred embodiment, receiving portion 650 receives a ferrule 640 or 642, and in an exemplary embodiment, receiving portion 650 includes an outer surface, a portion of which matches or corresponds to the shape of ferrule 640 or 642. In the embodiment shown in FIG. 6, receiving portion 650 has a rounded, concave, outer surface that matches or corresponds to the round outer surface of ferrule 650.

In some embodiments, ferrule 640 can be attached to receiving portion 650. Many different techniques can be used to join ferrule 640 with receiving portion 650, including adhesive bonding and the use of mechanical fasteners. However, Glassoldering® is preferred. Glassoldering® techniques are disclosed in U.S. Pat. Nos. 5,500,917 and 5,682,453, the disclosures of which are hereby incorporated by reference in their entirety.

Preferably, enclosure 602 includes a first receiving portion 650 associated with a first side wall 652 and a corresponding second receiving portion 654 associated with a second side wall 656. Preferably, the first receiving portion 650 and the second receiving portion 654 are aligned. This arrangement forms a first receiving region 653 that accommodates tap module 606. As shown in FIG. 6, first receiving portion 650 can engage incoming ferrule 640 and second receiving portion 654 can engage outgoing ferrule 642 as tap module 606 is placed in enclosure 606. Because incoming ferrule 640 is aligned with outgoing ferrule 642, it is beneficial to have first receiving portion 650 aligned with second receiving portion 654.

Although the first receiving portion 650 and the second receiving portion 654 can be formed in many different ways, a preferred way of forming the first receiving portion 650 and the second receiving portion 654 is to cut grooves into the respective side walls of enclosure 602.

In addition to having first receiving portion 650 and second receiving portion 654 associated with respective side walls 652 and 656, respectively, other receiving portions that can accommodate other tap modules can also be formed. In the embodiment shown in FIG. 6, other receiving portions are disposed laterally along first side wall 652 and second side wall 654. Preferably, these other receiving portions are similar in shape and design as first receiving portion 650 and second receiving portion 654.

Referring to FIG. 6, third receiving portion 658 is disposed laterally adjacent to first receiving portion 650 in first side wall 652 and fourth receiving portion 660 is disposed laterally adjacent to second receiving portion 654 along second side wall 656. Third receiving portion 658 and the fourth receiving portion 660 form a second receiving region 662. This second receiving region 662 is designed to accommodate a second tap module similar to tap module 606. This embodiment of the present invention is modular and one or many receiving regions can be formed on enclosure 602 as needed. Also, the size, shape and proportions of enclosure 602 can be changed to accommodate different numbers or sizes of receiving regions and tap modules.

Figure 7:
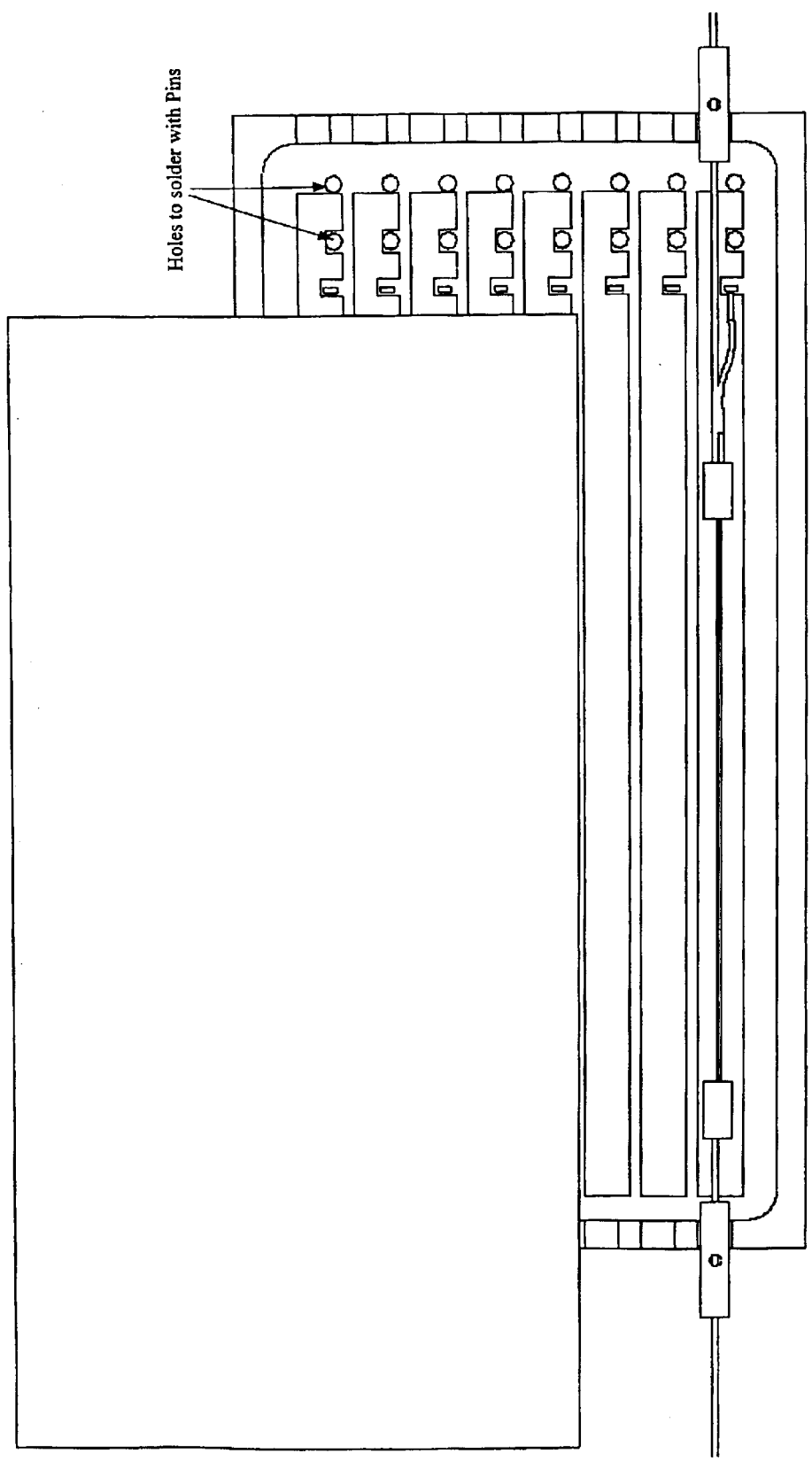
FIG. 7 is a top view of an embodiment of an array of tap monitors in accordance with the present invention.
Figure 8:
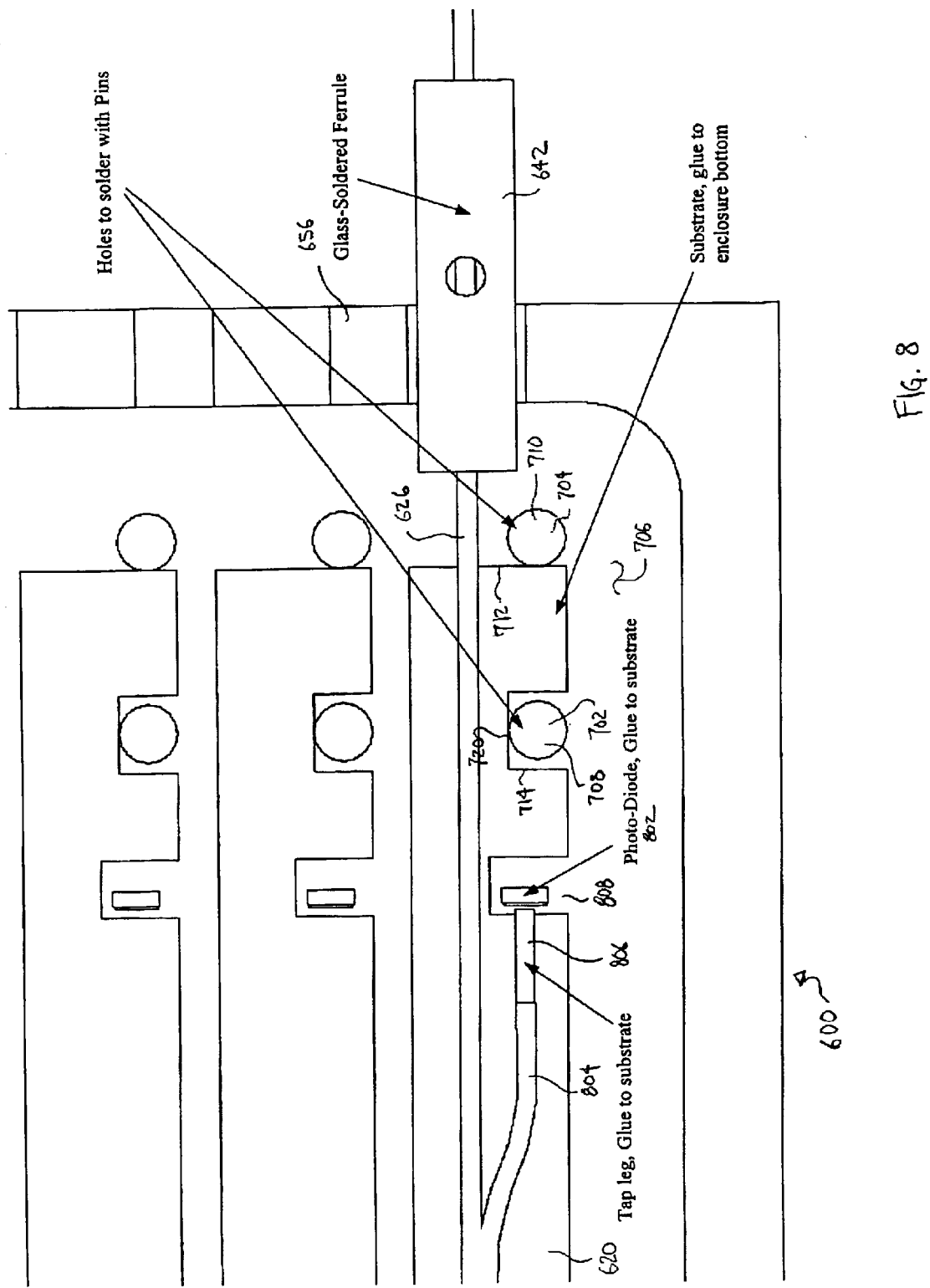
FIG. 8 is an enlarged view of an embodiment of an array of tap monitors in accordance with the present invention.

Referring to FIG. 7, which is a top view of enclosure 602 and FIG. 8, which is an enlarged top view, other elements of enclosure 602 can be seen in greater detail. Enclosure 602 includes provisions that help to securely associate and align tap module 606. In the embodiment shown in FIGS. 7 and 8, a first hole 702 and a second hole 704 are disposed in the bottom 706 of enclosure 602. Preferably, these holes receive respective first pin 708 and second pin 710. In some embodiments, pins 708 and 710 are soldered to the bottom 706 of enclosure 800.

First and second pins 708 and 710 assist in properly locating tap module 606 within enclosure 602. Given a tap module 606 of known length and width, first a second pins 708 and 710 are located within enclosure 602 so that the incoming ferrule 640 and the outgoing ferrule 642 are properly aligned with the first receiving Second pin 710 is designed to engage an outer edge 712 of tap module 606 and first pin 708 is designed to engage a notch 714 cut into substrate 620. Notch 714 acts as an alignment notch and helps to properly orient tap module 606 within enclosure 602 both longitudinally and laterally.

A notch end wall 720 engages one side of first pin 708 and first notch side wall 722 and second notch side wall 724 oppose opposite sides of pin 708. Notch end wall 720 and first and second notch side walls 722 and 724, respectively, surround first pin 708 on three sides.

To assist in securing tap module 606 to enclosure 602, an adhesive or glue can be applied. In the embodiment shown in FIGS. 6–8, the adhesive is applied between enclosure bottom 706 and the bottom surface of tap module 606.

Enclosure 602 can include an array of holes adapted to engage an array of pins so that other receiving regions throughout the enclosure 602 can have a similar alignment arrangement featuring two pins, as shown in FIGS. 6–8.

FIG. 8 also shows photo diode 802 and tap leg 804. Tap leg 804 is preferably analogous to a fourth leg 126 (see FIG. 1) of an optical device 104 (see FIG. 1) that is used to determine the optical activity occurring in optical device 104.

Tap leg 804 is preferably cut and includes a tap leg end 806 that is disposed proximate photo diode 802. In some embodiments, tap leg end 806 is attached to substrate 620. Any desired joint can be used, however, the use of an adhesive or glue to secure tap leg end 806 to substrate 620 is preferred. Tap leg end 806 is preferably disposed proximate a slot 808. This arrangement is similar to the arrangement shown in FIG. 2 where fourth fiber 126 is disposed proximate hole or slot 202 and sensor 130. Similarly, in the embodiment shown in FIG. 8, tap leg end 806 is disposed proximate slot 808 and photo diode 802. The alignment arrangement and the alignment principles disclosed in connection with the FIG. 2 embodiment regarding the sensor, the hole or slot and the optical fiber are preferably applied to this embodiment as well.

Figure 9:
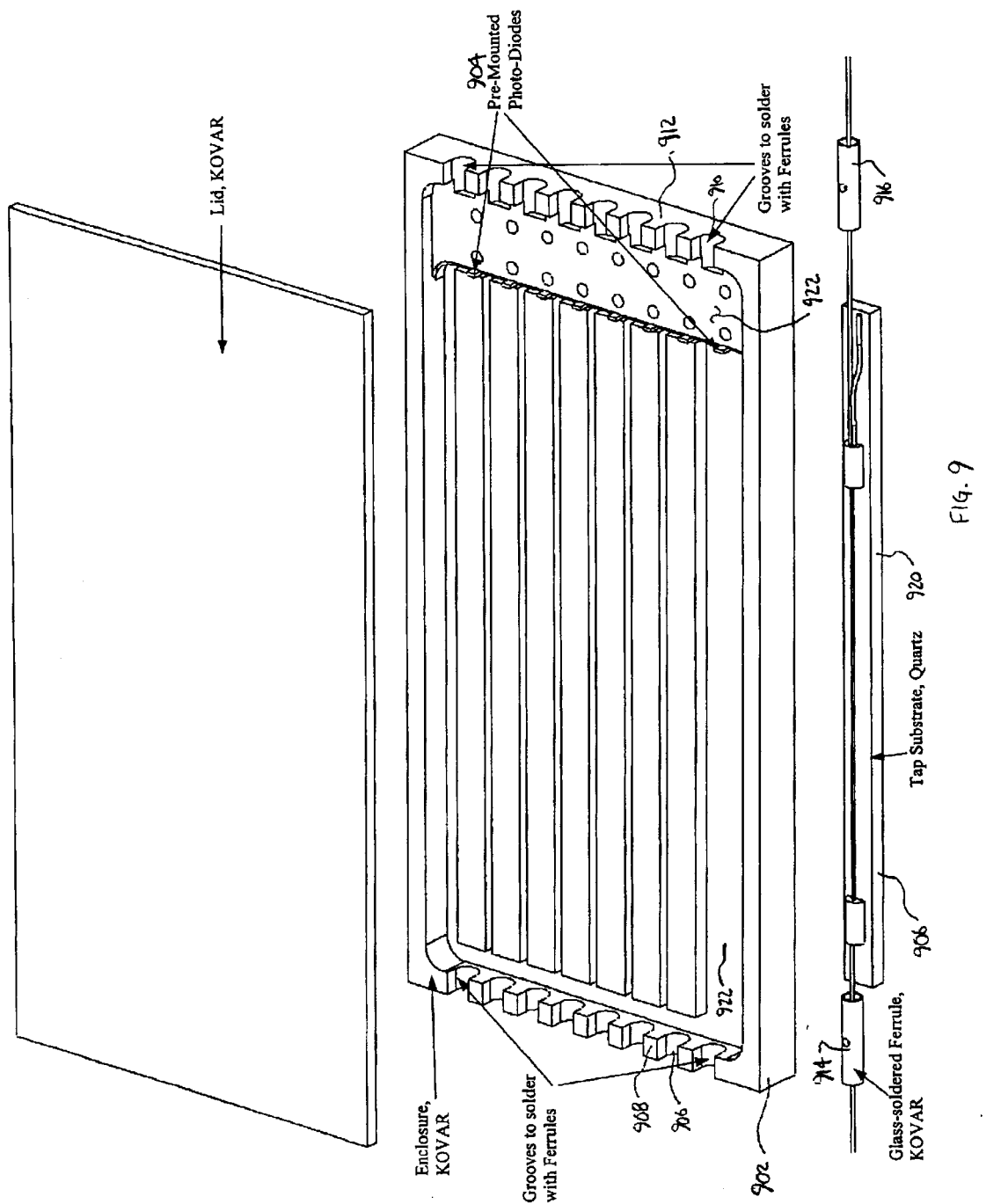
FIG. 9 is an isometric view of an embodiment of an array of tap monitors in accordance with the present invention.
Figure 10:
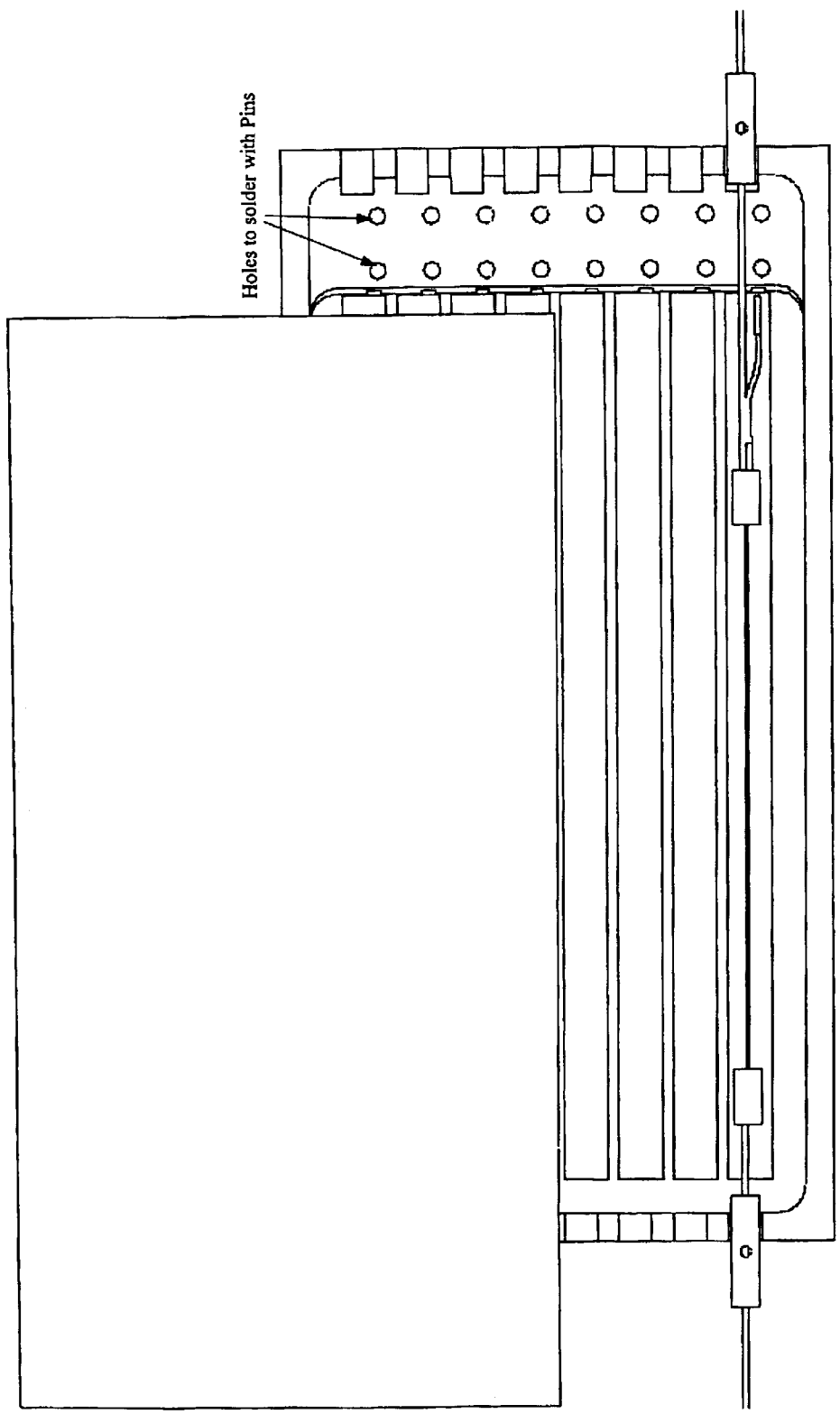
FIG. 10 is a top view of an embodiment of an array of tap monitors in accordance with the present invention.
Figure 11:
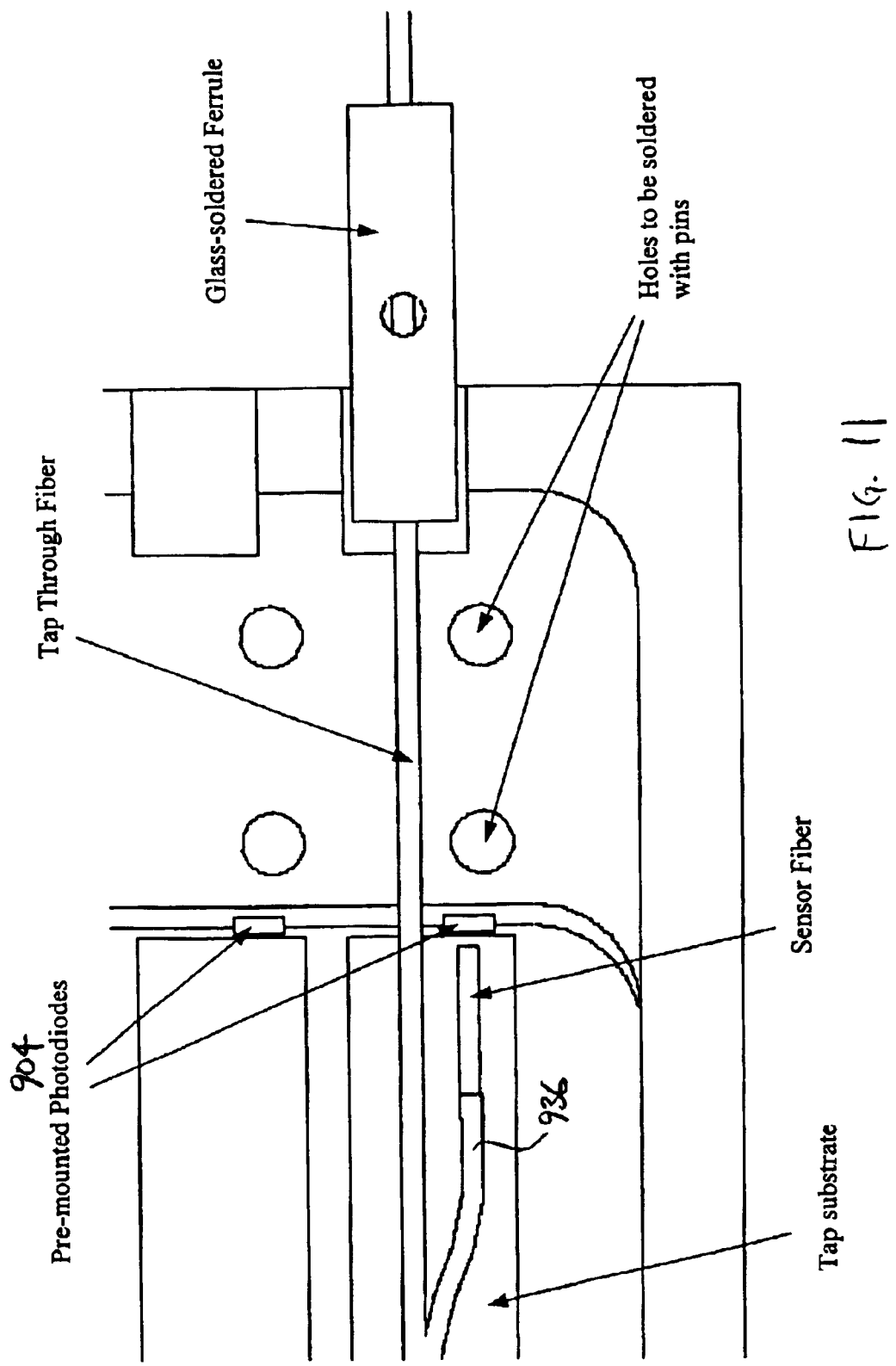
FIG. 11 is an enlarged view of an embodiment of an array of tap monitors in accordance with the present invention.

FIGS. 9–11 show another embodiment of the present invention. In this embodiment, photo diode 904 is mounted directly to enclosure 902 as opposed to the embodiment shown in FIGS. 6–8 where the photo diode or sensor 636 is mounted to substrate 620 of tap module 606.

Referring to FIG. 9, enclosure 902 has one or more first receiving portions 906 disposed on a first side wall 908 and one or more second receiving portions 910 disposed on a second side wall 912. First receiving portions 906 a preferably aligned with second receiving portions 910 in a manner that permits the receiving portions 906 and 910 to engage respective incoming and outgoing ferrules 914 and 916. First and second receiving portions 906 and 908 along with portions of enclosure bottom 920 form an array of receiving regions 922. Receiving regions 922 are designed to accept tap module 906.

Unlike the tap module 602 (see FIG. 6) of the embodiment shown in FIGS. 6–8, the tap module 906 of this embodiment includes a substrate 920 that is substantially shorter than the interior length of enclosure 902 and tap module 906 is designed to fit within a recessed portion 924 (see FIG. 12) formed in enclosure bottom 922.

Figure 12:
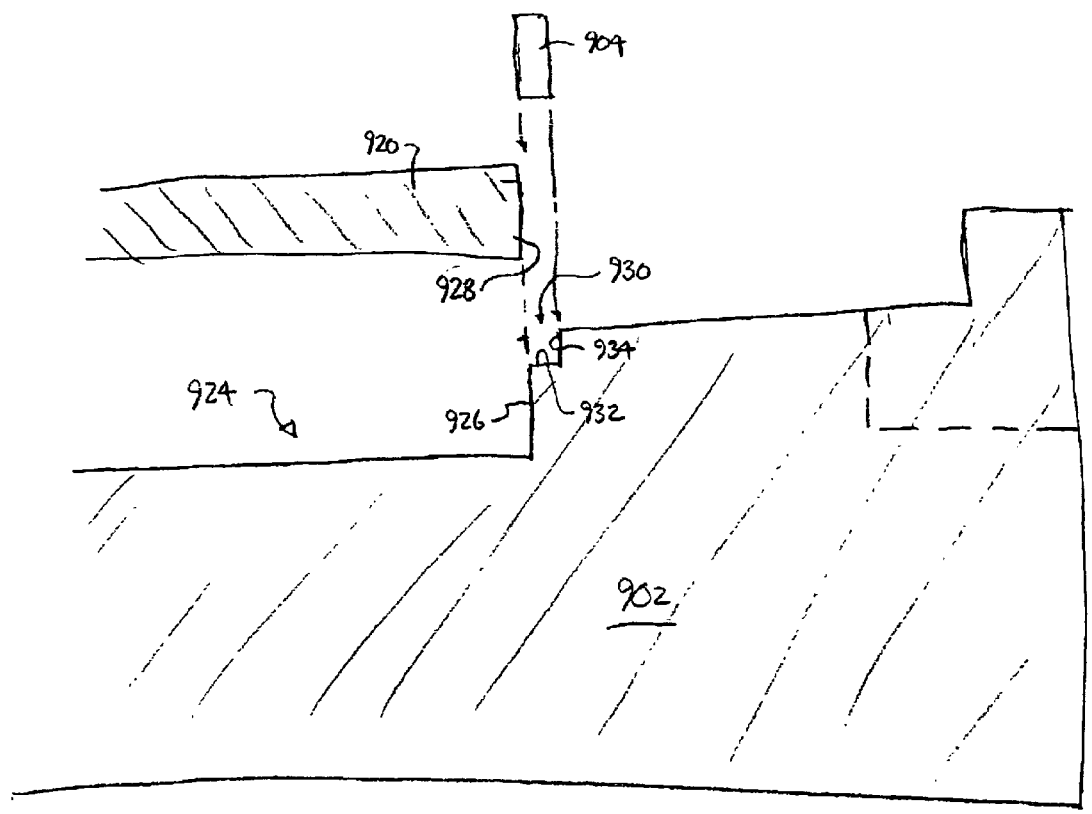
FIG. 12 is an exploded, cross-sectional elevational view of an embodiment of a portion of an enclosure in accordance with the present invention.

Referring to FIG. 12, which is an enlarged, exploded, cross-sectional elevation view of one end of enclosure 902, one end of recessed portion 924 includes a shoulder 926. A forward edge 928 of substrate 920 is designed to engage shoulder 926 during assembly. In addition to shoulder 926, enclosure 902 also includes a step 930. Step 930 is designed to receive photo diode 904 at a predetermined orientation. Preferably, step 930 includes a bottom surface 932 and a side surface 934 that retain photo diode 904 in a position to maximize its light gathering abilities when tap module 906 is installed. In other words, step 930 is designed to place a given photo diode 904 in proper alignment with tap leg or sensor fiber 936 (see FIG. 11) after installation. Using the principles of this embodiment, photo diode 904 can be preinstalled and pre-wired before tap module 906 is installed.

Figure 13:
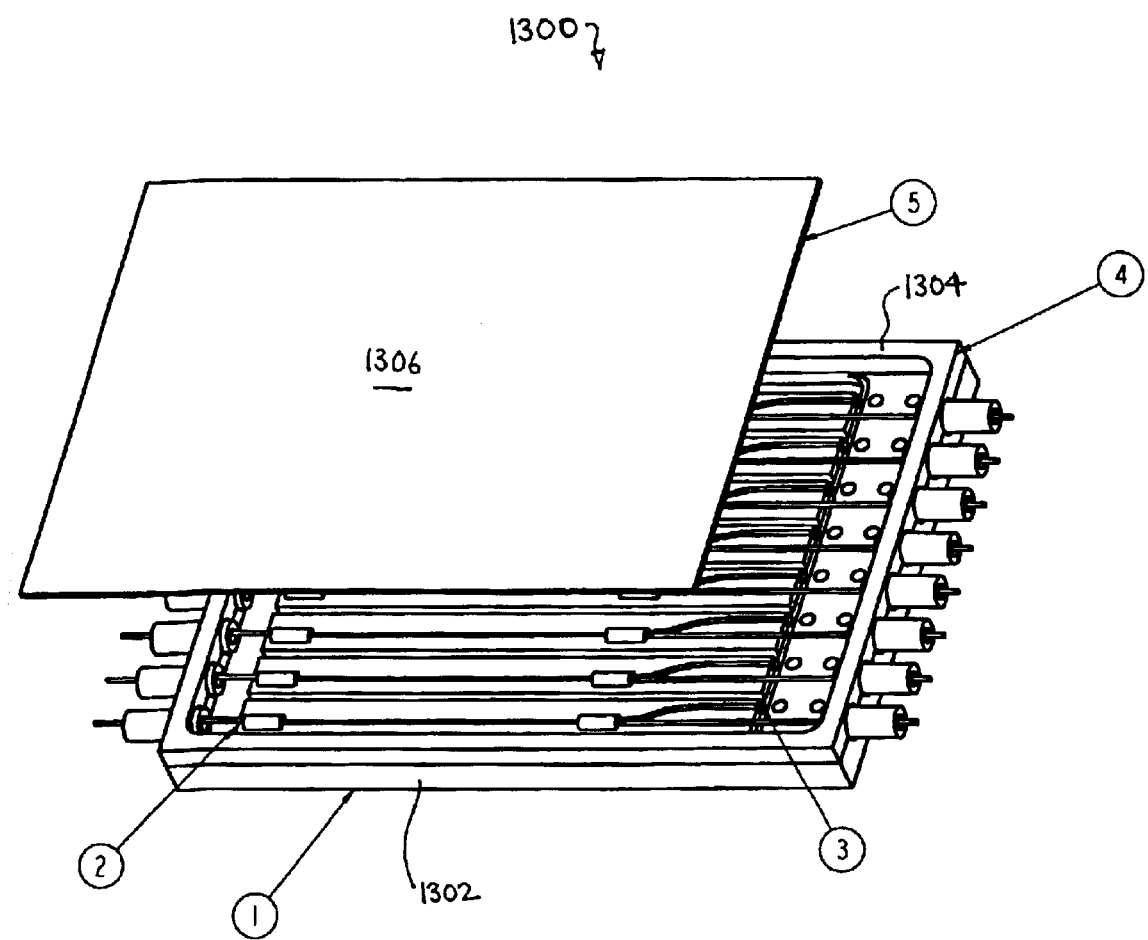
FIG. 13 is an isometric view of an embodiment of an enclosure in accordance with the present invention.
Figure 14:
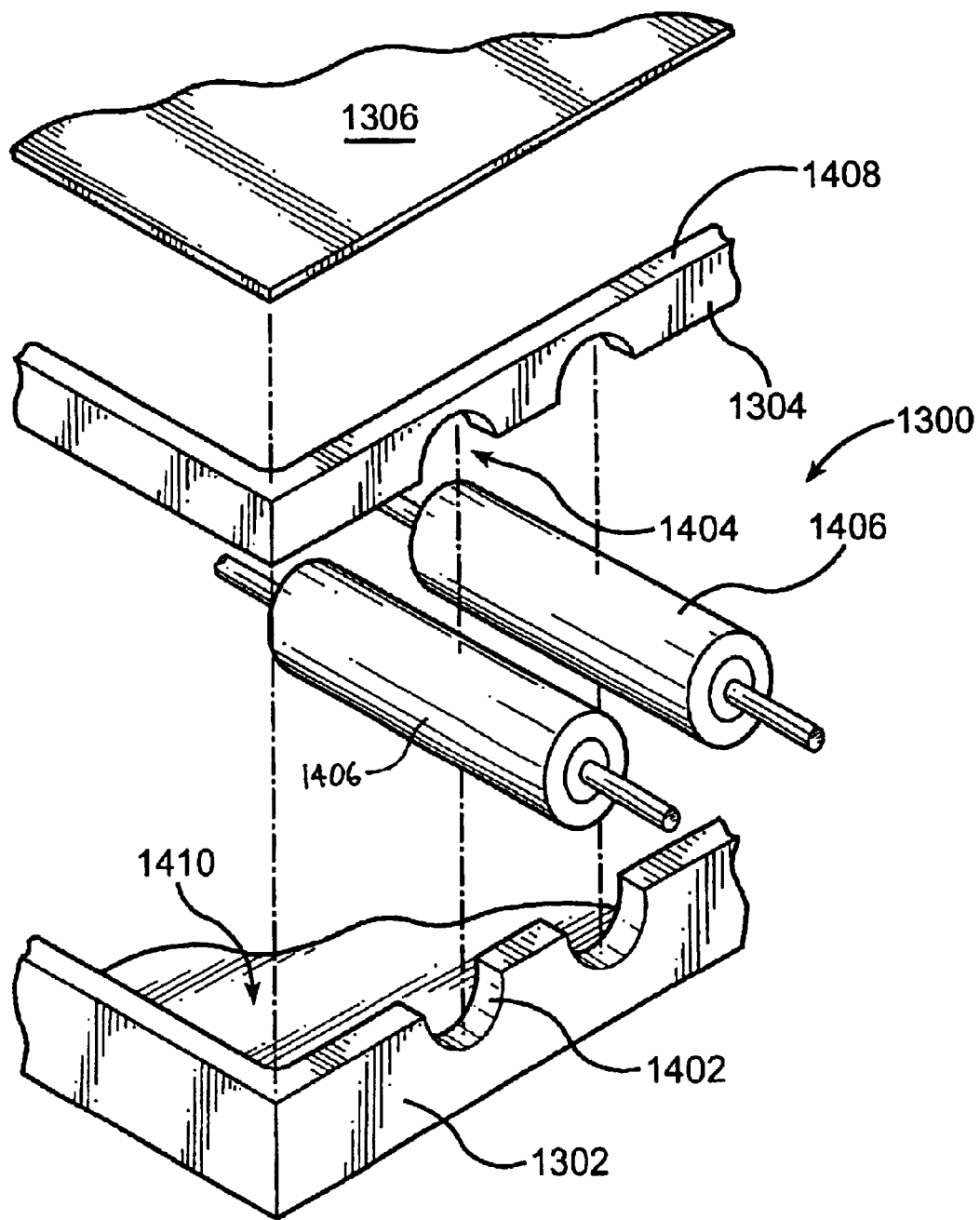
FIG. 14 is an exploded, isometric view of an embodiment of a portion of an enclosure in accordance with the present invention.

FIGS. 13 and 14 show another embodiment of the present invention. Enclosure 1300 includes a lower portion 1302, an upper portion 1304 and a lid 1306. Lower portion 1302 includes one or more lower receiving portions 1402. Preferably, lower receiving portion 1402 is shaped to accommodate at least one ferrule 1406. In an exemplary embodiment, lower receiving portion 1402 is designed to correspond with and snuggly embrace ferrule 1406. Similarly, upper portion 1304 includes an upper receiving portion 1404. Upper receiving portion 1404 is also shaped to accommodate ferrule 1406 and in an exemplary embodiment, upper receiving portion 1404 also snuggly embraces the upper portion of ferrule 1406.

As upper portion 1304 is brought together with lower portion 1302, the upper receiving portion 1404 and the lower receiving portion 1402 surround ferrule 1406. In other words, ferrule 1406 is sandwiched between upper receiving portion 1404 and lower receiving portion 1402. Preferably, the clearance between ferrule 1406 and the upper and lower receiving portions 1404 and 1406, respectively, is close enough to permit ferrule 1406 to be joined to the upper and lower receiving portions 1404 and 1406, respectively, by a solder reflow process, the preferred joining method.

Preferably, enclosure 1300 includes an upper receiving portion 1404 and the lower receiving portion 1402 for each ferrule 1406. Most embodiments include an incoming fiber and an outgoing fiber for each tap module. Preferably, as discussed above, both the incoming and the outgoing fibers would include respective ferrules. Thus, enclosure 1300 preferably includes an upper receiving portion 1404 and the lower receiving portion 1402 for each incoming ferrule and each outgoing ferrule. In the embodiment shown in FIG. 13, enclosure 1300 includes eight tap modules and would include eight corresponding upper and lower receiving portions on opposite sides for each of the incoming and outgoing ferrules. Additionally, other portions where upper portion 1304 and lower portion 1302 meet can also be joined or welded.

Upper portion 1304 also includes a substantially flat upper surface 1408. This permits a corresponding, substantially flat lid 1306 to engage upper surface 1408. Preferably, lid 1306 is affixed to upper surface 1408. In an exemplary embodiment, lid 1306 is seam welded to upper surface 1408. When this is done, interior 1410 of enclosure 1300 becomes hermetically sealed.

FIGS. 15–20 show another embodiment of the present invention. Referring now to FIGS. 15–20, wherein the showings are for the purpose of illustrating a preferred embodiment of the invention only, and not for the purpose of limiting same, the Figures show a device 10 for generating an electrical signal that is a function of the optical power in an optical fiber. (In the drawings, the respective parts in many instances are not drawn to scale, and in some instances, are exaggerated for the purposes of illustration).

Device 10 is comprised of an "n" by "m" fiber optic coupler 12 that is mounted onto a substrate 32. In the embodiment shown, coupler 12 is a 2×2 fixed, bi-conically-tapered splitter-coupler. Coupler 12 is formed from two continuous optical fibers, designated 22a, 22b, which have been coupled by conventionally known methods. Coupler 12 has a coupling region, designated 12a. Each fiber 22a, 22b has an outer jacket or buffer (not shown) comprised of a polymeric material that surrounds inner glass fiber cladding 26. As is conventionally understood, the jacket or buffer of fibers 22a, 22b are removed along a portion of their length to facilitate the manufacture of coupler 12. Fibers 22a, 22b are coupled to produce a desired coupling ratio between fibers 22a, 22b, depending upon the application. If the optical power in an optical fiber is to be measured, optical fibers 22a, 22b are preferably coupled to produce a coupling ratio of 95% to 5%, more preferably, 98% to 2%, and most preferably, 99% to 1% or less, wherein only a small fraction (5% or less) of light to be measured traveling in the one fiber will be split to the other fiber.

As will be appreciated from a further reading of the specification, the present invention may also find advantageous application where a beam of light is used to perform work. In this respect, microelectromechanical systems (MEMS) can be powered by light converted to electricity. In such applications, the fibers are preferably coupled, such that a large portion of light in the one fiber is coupled to the fiber where it is to be converted to electricity, and only a small portion of the light remains in the original fiber for a communication system.

Coupler 12 is fixedly mounted onto substrate 32. In the embodiment shown, substrate 32 is a cylindrical rod having a longitudinally extending groove 34 formed therein. Groove 34 is generally defined by a pair of planar, sloping side surfaces 36 and a planar bottom surface 38, as best seen in FIGS. 16 and 20. Substrate 32 is provided to support coupler 12. In the embodiment shown, coupler 12 is mounted to substrate 32 by a small amount of epoxy 42 disposed at opposite sides of coupling region 12a. The primary purpose of epoxy 42 is to hold coupler 12 in place upon substrate 32 until coupler 12 is subsequently secured to substrate 32 by a glass bonding composition 44. Glass bonding composition 44 is comprised essentially of a glass powder and a volatile solvent in a slurry form. The slurry is allowed to dry by allowing the volatile solvent to evaporate, resulting in a solid mass that is softened, preferably by a laser 48 (schematically illustrated in FIG. 17), to bond glass fibers 26 of optical fibers 22 to substrate 32. In this respect, bonding composition 44 and substrate 32 are preferably formed of glass having similar physical properties, e.g., coefficient of thermal expansion, as the glass-forming cladding of fibers 22. A suitable glass-based bonding composition, is disclosed in prior U.S. Pat. Nos. 5,500,917 and 5,682,453 both to Daniel et al., the disclosures of which are expressly incorporated herein by reference.

In accordance with the present invention, a light-sensitive device 52 is disposed in line with one optical fiber 22b to receive light flowing therethrough. In the embodiment shown, light-sensitive device 52 is a photo detector 54 that is mounted on a substrate 56. In the embodiment shown, photo detector 54 is a photo diode, manufactured by Judson Technologies of Montgomeryville, Pa., and designated by Part No. J16-CXX-S400U-SC-GOULD. As will be appreciated by those skilled in the art, other photo detector junctions (PN, PIN) of germanium, and other device technologies, such as InGaAs (indium gallium arsenide) may also find advantageous application in the present invention. Photo detector 54 is generally a flat, rectangular device having a light-sensitive, front surface 54a, and a non-sensitive back surface 54b.

Substrate 56, as best seen in FIG. 20, is a generally flat, rectangular plate, that is preferably formed of a ceramic material, such as by way of example and not limitation, alumina ($Al_2O_3$). One side of the substrate includes two, spaced-apart, side-by-side conductive leads 62, 64, typically formed of gold, that are similar to trace lines of a printed circuit board.

Back side 54b of photo diode 54, which is all metal, is mounted onto lead 62 to be in electrical contact therewith. In a preferred embodiment, back side 54b of photo diode 54 is eutectically bonded to lead 62 on substrate 56. Depending upon how light-sensitive device 52 is attached to substrate 32, as shall hereinafter be described, alternate means, such as a conductive epoxy, may be used to conductively attach the conductive back side 54b of photo diode 54 to lead 62. An electrical path is formed from the front side of photo diode 54 to lead 64 by a bridging connecting wire 66. In the embodiment heretofore described, lead 62 is a cathode lead and lead 64 is an anode lead for photo diode 54.

Light-sensitive device 52 is disposed within a slot 72 (as best illustrated in FIG. 5) that is cut through substrate 32, glass bead 44 and optical fiber 22b. Slot 72 is preferably cut by a highly accurate, precision rotary saw having a diamond blade. A saw blade manufactured by Disco Hi-Tech America, Inc. of Chantilly, Va., under Model No. PIA 862 SD4000 N100 BR50, is used to form slot 72. As will be appreciated, other precision saws, saw blades and other types of machining processes, may find advantageous application in forming slot 72. In this respect, the saw used to form slot 72 in and of itself forms no part of the present invention.

As best seen in FIG. 19, slot 72 extends through approximately one-half (½) of substrate 32 and through one optical fiber of coupler 12, severing the same. In the embodiment shown, the severed fiber is fiber 22b. Fiber 22b is severed to one side of coupling region 12a. Fiber 22b is severed at a location where fiber 22b is rigidly secured to substrate 32 to ensure a smooth, clean cut through fiber 22b. Preferably, fiber 22b is cut at or near a location where fiber 22b is rigidly secured to substrate 32 by epoxy bead 42 or glass bead 44. In the embodiment shown, slot 72 is formed through glass bead 44, thereby severing fiber 22b at a location where fiber 22b is encased and secured to substrate 32 by glass bead 44. As best seen in FIG. 19, slot 72 does not penetrate, i.e., does not cut into, fiber 22a.

The width W of slot 72 is dimensioned to be slightly larger, i.e., slightly wider, than the thickness of light-sensitive device 52. In this respect, light-sensitive device 52 may be easily positioned within slot 72. Light-sensitive device 52 is positioned such that light-sensitive front surface 54a of photo diode 54 faces coupling region 12a, and a portion of light-sensitive front surface 54a is aligned with and intersects optical fiber 22b, as best illustrated in FIG. 17. Slot 72 is cut within substrate 32 such that photo diode 54 is perpendicular to optical fiber 22b, when light-sensitive device 52 is inserted within slot 72.

Light-sensitive device 52 may be secured in place to substrate 32 by numerous types of adhesive material applied to back surface of substrate 56. In a preferred embodiment, a glass-based bonding composition, such as that described above, is used to secure light-sensitive device 52 to substrate 32. With light-sensitive device 52 in the appropriate position within slot 72, a bead (not shown) of the glass-based bonding composition may be placed along the upper edge of the existing bead 44 where bead 44 meets the back surface substrate 56. Focused and localized heat is applied to the bead of glass-based bonding material to soften the glass therein. The glass-based bonding composition is preferably softened by a laser directed to the backside of substrate 56, as schematically illustrated in FIG. 17.

In accordance with a preferred embodiment of the present invention, existing glass bead 44 is softened by the application of localized heat to soften the glass material of glass bead 44, wherein the softened glass material will bond the back surface of substrate 56 to substrate 32.

As best seen in FIG. 17, no bonding material is disposed between light-sensitive front surface 52a and the cut end of optical fiber 22b.

Referring now to the operation of a device 10 for generating an electrical signal that is a function of the optical power in an optical fiber, leads 62, 64 of device 10 are attached to a monitor (by means not shown) that detects and interprets signals from device 10. A light wave L to be measured is directed into a launch fiber of device 10. In the embodiment shown, optical fiber 22a is the launch fiber, as indicated in FIG. 15. As indicated above, for a device 10 intended to provide a signal indicative of the optical power in an optical fiber, coupler 12 is formed so that only a small portion of the light in launch fiber 22a is coupled to a receiving fiber 22b. Accordingly, as a result of the coupling region 12a, a small portion, Ls, of light wave L is split into optical fiber 22b, a major portion, Lm, of light wave L being maintained in optical fiber 22a and continuing along such fiber. Light Ls split into fiber 22b impacts light-sensitive, front surface 54a of photo diode 54. Based upon the intensity of light Ls impinging upon front surface 54a, an electrical signal is generated by photo diode 54 and sent as an electrical signal along electrical leads 62, 64 to a monitoring device (not shown). The intensity of portion Ls of light wave L that is split into optical fiber 22b is a function to the intensity of the light Lm remaining in optical fiber 22a and thus provides an indication of such intensity. As will be appreciated by those skilled in the art, the electrical signal generated by device 10 is a function of the type of photo diode 54 used, the number and wavelength(s) of light being detected and the intensity of such light. In this respect, it is clear that different types of photo diodes 54 will provide different signals. With respect to the light itself, equal optical powers at different wavelengths will produce different currents, as will a light comprised of a single or multiple wavelengths. Still further, it will be appreciated that the response of a photo diode is not linear. Accordingly, the electrical signal provided by device 10 must be interpreted considering these factors.

The present invention thus provides a relatively simple, yet reliable device for monitoring the intensity of a light signal in an optical fiber. Bead 44 of glass bonding material fixedly holds optical fiber 22b in place during the formation of slot 72 and the attachment of photo detector 54 to substrate 32. Bead 44 prevents shifting or damage to optical fiber 22b and coupler 12 during formation of slot 72, and further maintains proper alignment of optical fiber 22b with photo detector 54 after assembly and during use.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. An array assembly comprising:
    an enclosure configured to receive at least one tap module, wherein a bottom of the enclosure includes at least one hole configured to receive a pin;
    a first tap module including a substrate, and a first optical fiber, the first optical fiber including an incoming portion, an inner portion and an outgoing portion;
    the inner portion including a fused, bi-conically tapered region wherein a second fiber is fused with the first optical fiber, the second fiber including a first end proximate the incoming portion of the first fiber and a second end proximate the outgoing portion of the first fiber;
    the second end being disposed proximate a slot and a sensor, wherein the sensor is configured to receive a signal from the second end; and
    a second tap module similar to the first tap module, both the first and second tap modules being contained within the enclosure.

2. An array assembly according to claim 1, wherein the pin is configured to engage a notch disposed in the substrate of the first tap module.

3. An array assembly according to claim 2, wherein an incoming ferrule is aligned with a first receiving portion when the pin engages the notch.

4. An array assembly according to claim 3, further comprising a first side wall, wherein the first side wall includes the first receiving portion.

5. An array assembly according to claim 2, wherein an outgoing ferrule is aligned with a second receiving portion when the pin engages the notch.

6. An array assembly according to claim 5, further comprising a second side wall, wherein the second side wall includes the second receiving portion.

7. An array assembly according to claim 1, wherein the incoming portion includes an incoming ferrule and the outgoing portion includes an outgoing ferrule.

8. An array assembly according to claim 7, wherein the incoming ferrule engages a first receiving portion and the outgoing ferrule engages a second receiving portion.

9. An array assembly according to claim 1, further comprising a ferrule coaxially disposed over the first optical fiber wherein the ferrule is surrounded by an upper portion and a lower portion of the enclosure.

10. An array assembly comprising:
    an enclosure configured to receive at least one tap module;
    a first tap module including a substrate, and a first optical fiber, the first optical fiber including an incoming portion, an inner portion and an outgoing portion, wherein the incoming portion includes an incoming ferrule and the outgoing portion includes an outgoing ferrule;
    the inner portion including a fused, bi-conically tapered region wherein a second fiber is fused with the first optical fiber, the second fiber including a first end proximate the incoming portion of the first fiber and a second end proximate the outgoing portion of the first fiber;
    the second end being disposed proximate a slot and a sensor, wherein the sensor is configured to receive a signal from the second end; and
    a second tap module similar to the first tap module, both the first and second tap modules being contained within the enclosure.

11. An array assembly according to claim 10, wherein a bottom of the enclosure includes at least one hole.

12. An array assembly according to claim 11, wherein the hole is configured to receive a pin.

13. An array assembly according to claim 12, wherein the pin is configured to engage a notch disposed in the substrate of the first tap module.

14. An array assembly according to claim 13, wherein an incoming ferrule is aligned with a first receiving portion when the pin engages the notch.

15. An array assembly according to claim 14, further comprising a first side wall, wherein the first side wall includes the first receiving portion.

16. An array assembly according to claim 13, wherein an outgoing ferrule is aligned with a second receiving portion when the pin engages the notch.

17. An array assembly according to claim 16, further comprising a second side wall, wherein the second side wall includes the second receiving portion.

18. An array assembly according to claim 10, wherein the incoming ferrule engages a first receiving portion and the outgoing ferrule engages second receiving portion.

19. An array assembly according to claim 10, further comprising a ferrule coaxially disposed over the first optical fiber wherein the ferrule is surrounded by an upper portion and a lower portion of the enclosure.

* * * * *